United States Patent [19]

Glaze

[11] 4,408,398

[45] Oct. 11, 1983

[54] GAGE FOR LAYING BLOCKS

[76] Inventor: John R. Glaze, 8250 Lankershim Blvd., Space 7, North Hollywood, Calif. 91605

[21] Appl. No.: 302,496

[22] Filed: Sep. 16, 1981

[51] Int. Cl.³ .......................... G01B 3/30; G01B 5/25
[52] U.S. Cl. ................................................ 33/180 R
[58] Field of Search ............ 33/180 R, DIG. 28, 404; 52/561

[56] References Cited

U.S. PATENT DOCUMENTS

| | | | |
|---|---|---|---|
| 915,982 | 3/1909 | Maddux | 33/180 R |
| 2,534,940 | 12/1950 | Arnold | 33/180 R |
| 2,543,716 | 2/1951 | Carini | 33/180 R |
| 2,543,717 | 2/1951 | Carini | 33/180 R |
| 3,174,227 | 3/1965 | House | 33/180 R |

*Primary Examiner*—Willis Little

*Attorney, Agent, or Firm*—Beehler, Pavitt, Siegemund, Jagger & Martella

[57] ABSTRACT

An apparatus and system for keeping the mortar between blocks uniform in thickness in both a vertical and horizontal direction makes use of a gage member having spacers for placement between the blocks and which are removable as soon as each block in turn has been placed in position with a mortar joint. Each separate gage member has for spacers a set of rods shorter than the thickness of the blocks for separating one block from the next when the mortar is placed between the blocks. A positioning guide on the gage member for engagement with an exposed side wall of the block determines how far the rods will project across the temporarily exposed face of the block. Adjacent the guide is a handle for placing and withdrawing the gage member as the laying of blocks progresses.

6 Claims, 12 Drawing Figures

U.S. Patent  Oct. 11, 1983  Sheet 1 of 3  4,408,398
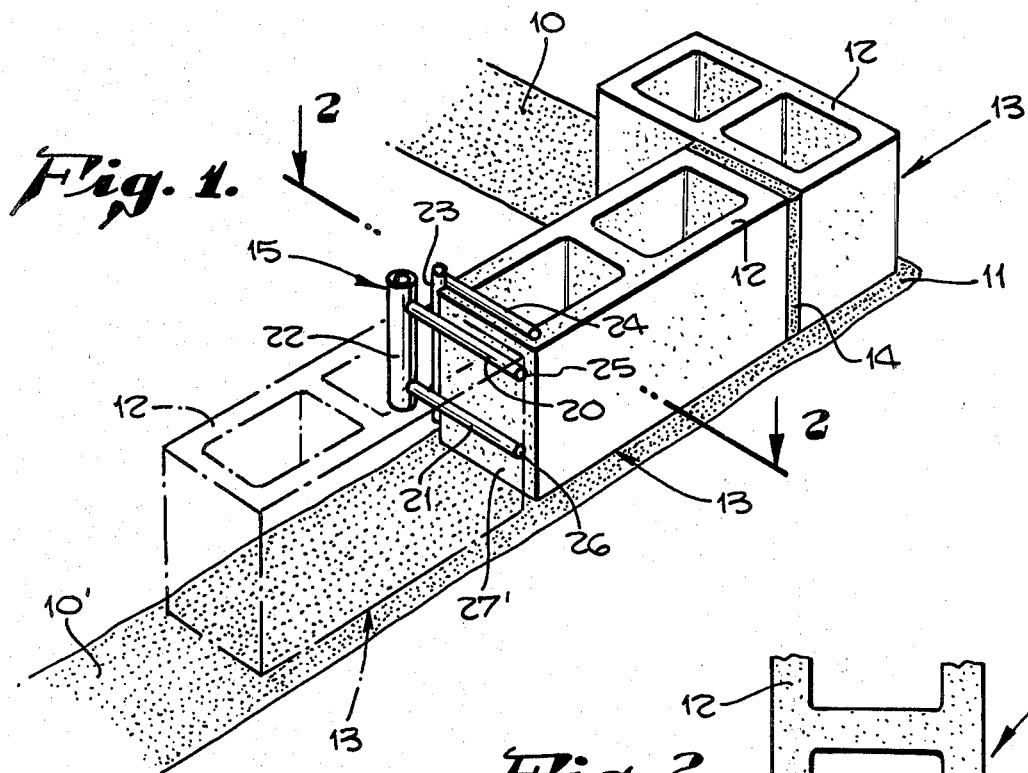
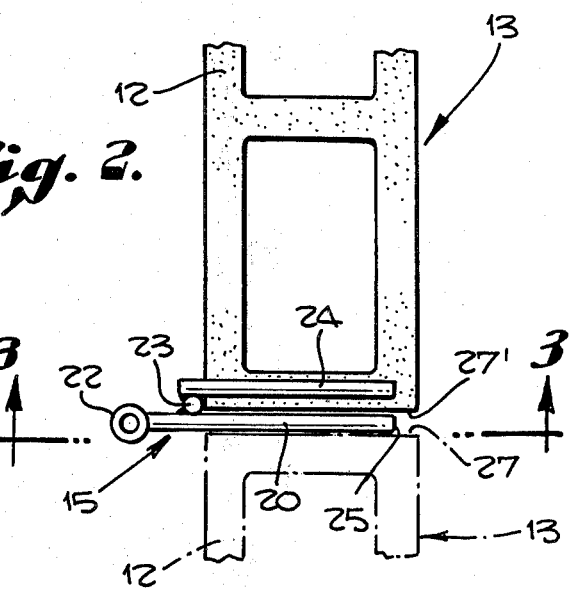
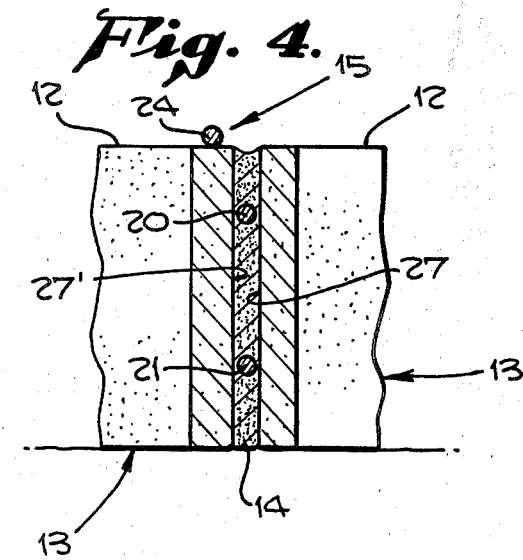
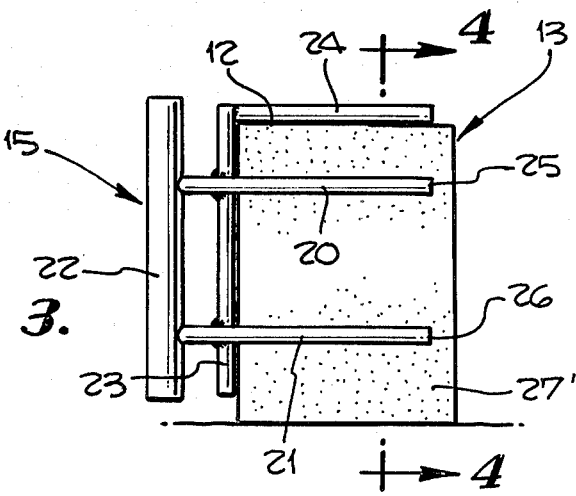

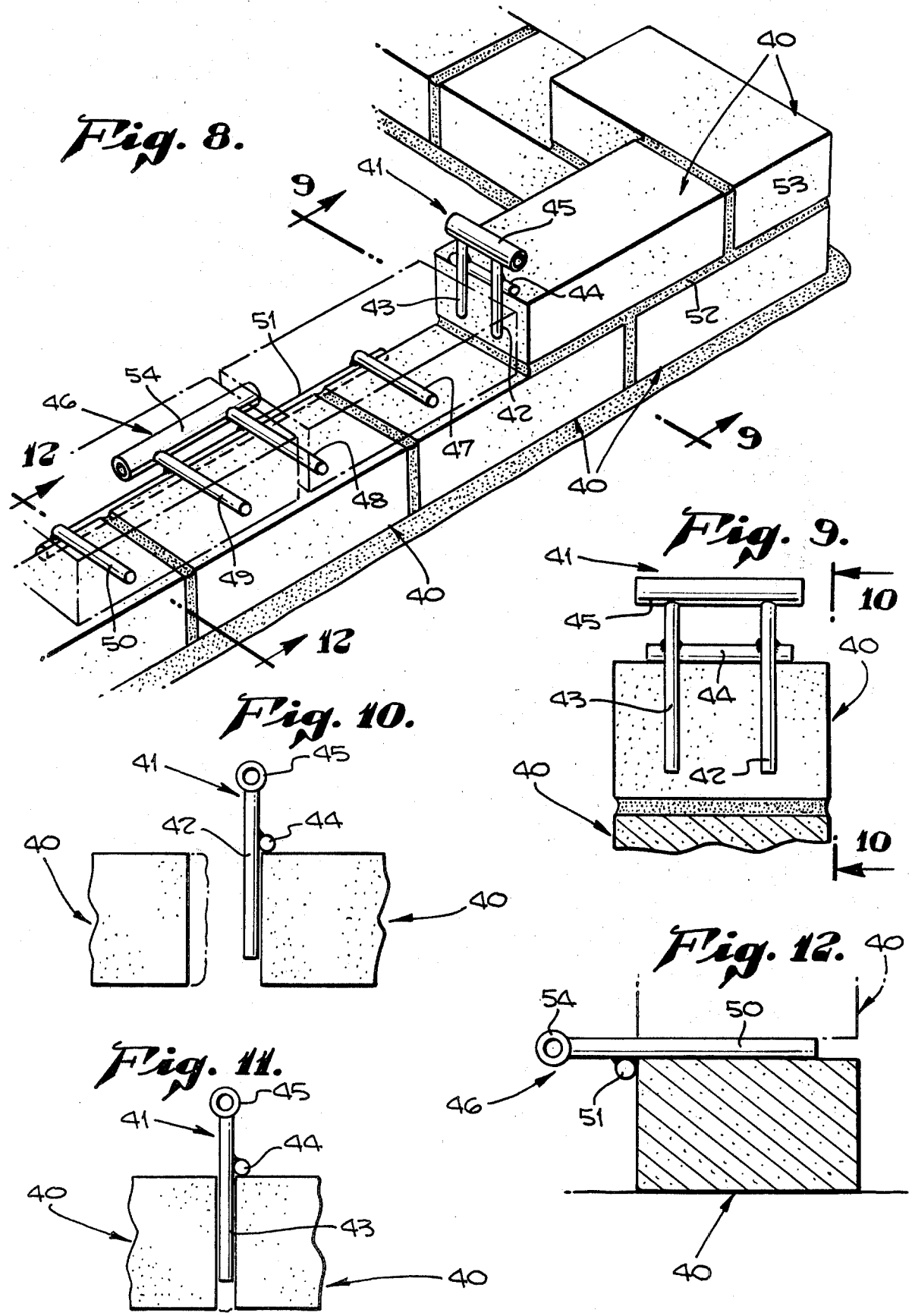

GAGE FOR LAYING BLOCKS

The customary way for building up a masonry wall, whether it chances to be a block wall or brick wall, is to lay the blocks one by one in a bed of mortar and adjust each block in turn so that its position is in alignment and properly spaced from the next preceding block together with the course of blocks beneath it. It is a hand operation with craftsmen being depended upon to keep the blocks level, to properly align them, and to have a proper amount of mortar in the joint which separates the blocks so that when the wall is finished, the joints will be of uniform thickness and in a workmanlike alignment. For workmen accustomed to handling blocks, bricks and mortar, the building of a wall in this fashion can be handled with reasonable rapidity. A skilled craftsman intuitively places approximately the right amount of mortar between the blocks sufficient that no more than a modest amount of tapping is necessary to have the mortar of a proper and uniform thickness after a series of blocks have been laid and leveled in position.

Although the mechanics of laying a block wall is relatively elementary, persons unskilled or unaccustomed to work of this kind frequently have no more than modest success in achieving a workmanlike job. If, as is often the case, too much mortar is placed between the blocks, an undue amount of excess mortar is squeezed out. Such extra mortar is often wasted and, even when not wasted, tends to smear the face of the block. Also, an undue amount of tapping may be necessary to move the block down to a proper level, which may result in an undependable joint, procured with an unnecessarily great expenditure of time. When insufficient mortar is placed between the blocks, they cannot be brought level and usually have to be removed, the mortar scraped out, and a new batch put in place. Very frequently, despite great care and an exceptional expenditure of time, the finished job of the unskilled craftsman will lack the desired neat and uniform appearance customarily expected of a finished wall of the type made reference to.

It is therefore among the objects of the invention to provide a new and improved gage for laying up block walls which provides uniform spacing of the joint separating one block from another.

Another object of the invention is to provide a new and improved gage for the laying of block walls which automatically determines the spacing of blocks, whether in a vertical or horizontal direction, and which, once the lower course has been leveled, serves additionally as an automatic leveling expedient.

Still another object of the invention is to provide a new and improved gage for the laying of block walls which, in addition to automatically leveling each succeeding course with a joint of uniform thickness helps to minimize the time needed to butter, lay, align and level the blocks as the wall building progresses.

Still another object of the invention is to provide a new and improved gage for the laying of block walls, whether they be of concrete block, brick, or other block of uniform dimensions, which is simple/ rugged and dependable/ menabling blocks to be laid not only uniformly but also with ma substantial saving of time. m With these and other objects in view, the invention mconsists of the constructionngement and combination of the various parts of the device serving as an example only of one or more embodiments of the invention, whereby the objects contemplated are attained, as hereinafter disclosed in the specification and drawings, and pointed out in the appended claims.

FIG. 1 is a perspective view showing the first blocks laid for the lower course of a wall structure.

FIG. 2 is a fragmentary plan view of the operation of FIG. 1, on the line 2—2 of FIG. 1.

FIG. 3 is an end elevational view on the line 3—3 of FIG. 2.

FIG. 4 is a fragmentary longitudinal sectional view on the line 4—4 of FIG. 3.

FIG. 8 is a fragmentary perspective view similar to FIG. 5 but showing the laying of common brick.

FIG. 9 is an end elevational view on the line 9—9 of FIG. 8.

FIG. 10 is an exploded fragmentary longitudinal sectional view on the line 10—10 of FIG. 9.

FIG. 11 is a view similar to FIG. 10 but showing the joint closed.

FIG. 12 is an end elevational view partially in section taken on the line 12—12 of FIG. 8.

Figure 5:
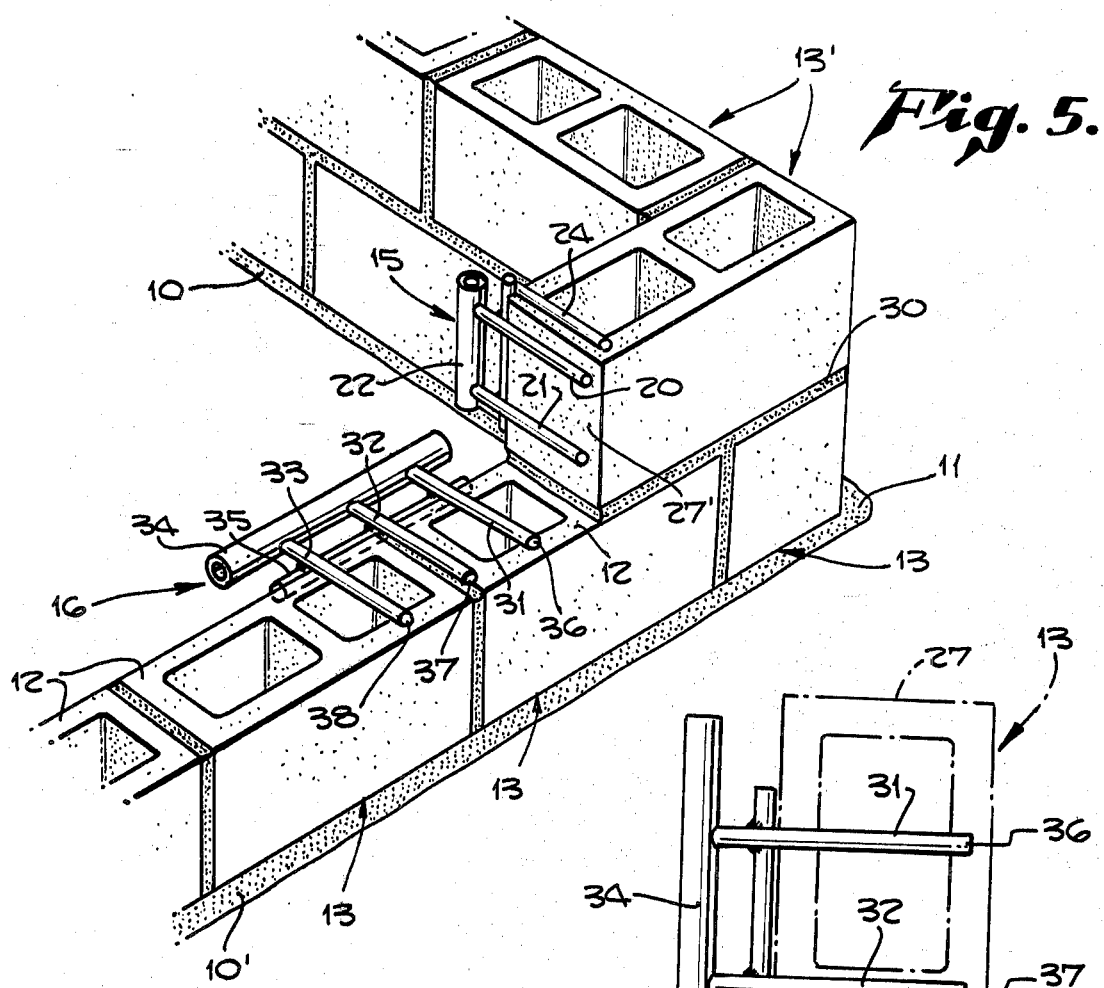
FIG. 5 is a perspective view similar to FIG. 1 but showing blocks laid on the course next above the lower course.
Figure 6:
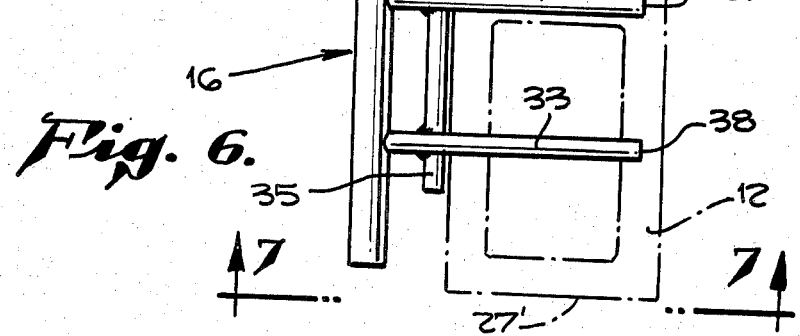
FIG. 6 is a fragmentary plan view from FIG. 5 showing the gage member which is used for vertical spacing of blocks.
Figure 7:
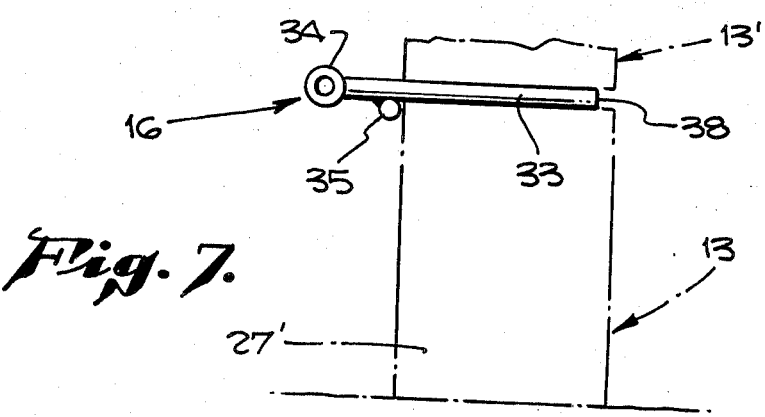
FIG. 7 is a fragmentary vertical elevational view on the line 7—7 of FIG. 6.

In laying up a masonry wall of block or brick, or the like, foundation courses 10 and 10' may be laid, for example, establishing a corner location 11. The corner has been chosen as an appropriate example featuring use of the gage apparatus of the invention. Before the block wall is to be laid, good practice suggests that stakes be set outside the corners and strings stretched from one corner of the foundation to another, allowing the strings to cross on the corners where the blocks are to be laid, strings having been omitted from the example in FIG. 1. Good practice suggests use of a square about two feet on a side and having the strings just touch both sides of the square to secure a gage for true alignment. The strings should be at least one-fourth inch lower than the side of the block to be laid. When the blocks are actually laid, good practice suggests that they be set about one-sixteenth inch inside the string to avoid inadvertent pressure against the string.

Although foundations are intended to be level when laid, rarely is the upper surface precisely as level as a first course of block should be. As a consequence, the lowermost course of block should be carefully laid with the aid of a conventional spirit level so that all upper horizontal transverse faces 12 of blocks 13 of the lower course are level with each other. Normally good practice will suggest that one corner block be set as, for example, the endmost block of FIG. 1, and the second block be set next to it as shown by the solid line of FIG. 1, separated by a mortar joint 14.

Two gage members are usually adequate as constituting an effective gage apparatus for wall work of the kind described. One is a relatively smaller horizontal spacer gage member 15. The other is a relatively larger vertical spacer gage member 16. For the lowermost course of block 13 only the horizontal spacer gage member 15 is needed. This gage member consists of a pair of rods 20 and 21 anchored to a handle 22 in longitudinally spaced relationship. Anchoring may be by a weldment. A positioning guide 23 is located in right angular relationship to the rods 20 and 21 to which it is secured by appropriate weldments. The positioning guide 23 is secured to the rods 20 and 21 at such a location that those portions of the rods extending toward respective free ends 25 and 26 have a length slightly less than the width of the block 13 with which the gage member is to be used. The overall length of the rods 20 and 21 is made such that there will be a comfortable spacing between the handle 22 and the positioning guide 23 for a comfortable handhold.

In addition to the positioning guide 23, there is a second positioning guide 24, secured at its captured end to the positioning guide 23 by an appropriate weldment. The positioning guide 24 extends parallel to the rods 20 and 21 and is in a position such that it rests upon the transverse face 12 of the block 13 in order to, in effect, hang the gage member 15 in position when it is being used, as shown in FIG. 1.

In the embodiment chosen for the gage member, the rods 20 and 21 are solid cylindrical rods, as are also the positioning guides 23 and 24. The handle 22 is tubular. Structural forms of rod or tubular shape are chosen as a matter of convenience and economy inasmuch as raw material is readily available and with the aid of an appropriate fixture or jig, the parts may be readily cut, quickly assembled, and anchored together by appropriate weldments in a conventional fixture.

To assure the mortar joint 14 being of consistent proper thickness, it is preferred to have the diameters of the rods 20 and 21 slightly smaller than the anticipated ultimate thickness of the joint 14 because, as a matter of practice, each block in turn as it is moved against the gage member 15 tends to ease off slightly, allowing some slump in the mortar of the joint. It has been found in practice that for a joint to be of substantially ⅜ inches in thickness, rods having a diameter of 5/16 inches are suitable when a mortar mix of sand and cement having the conventional degree of consistency for work of this kind is employed.

In terms of the trade, the mortar should be mixed with sufficient water so that when the trowel is turned on edge and cut through the already mixed mortar, the mortar is firm enough not to run together.

In laying the third block of the course shown in FIG. 1, the gage member 15 is suspended in the position there shown on the block 13 previously layed. The new block which is to be layed is temporarily stood on end, with one transverse end face uppermost. A quantity of mortar is then put on the outer and inner edges. Mortar is also placed on the top of the foundation course 10', and the block 13 is then layed on the foundation course and moved endwise so that the mortared transverse end face 27 is pressed against the rods 20 and 21, in a position adjacent and parallel to a transverse end face 27' of the block 13 which is already in place. The block is then tapped to level it by employment of a conventional spirit level (not shown) so that it is level, and is at the same time at exactly the same elevation as the block which is already in place. Mortar adjacent the outside face completely closes the mortar joint on the outside face of the wall structure. By grasping the handle 22, the gage member 15 is then withdrawn from its position between the blocks, and the newly laid block 13 will then be in its desired position. The two holes on the inside which are formed when the rods 20 and 21 are withdrawn, can be readily closed by use of a conventional striker tool in the joint.

For laying the next higher block course, good practice suggests that endmost corner blocks 13' be set in position. A horizontal mortar joint 30 should be carefully made of the desired thickness. For laying the next block, not shown, on the front face of the wall, the gage member 15 is suspended on the corner block 13' in the same manner as described in connection with FIG. 1. The vertical spacer gage member 16 is then also placed in the position shown. The gage member 16 is built in a similar fashion with rods 31, 32 and 33, anchored in longitudinally spaced relationship to a handle 34 by appropriate weldments. A positioning guide 35 extends across all of the rods 31, 32 and 33 and is anchored to them by appropriate means such as weldments. The location of the junction of the positioning guide with the rods is such that those portions of the rods between the weldment and the respective free ends 36, 37 and 38 have each a length less than the thickness of the block, as was described in connection with the gage member 15. Here also the rods 31, 32 and 33 are made of such length that the remaining portions of the rods provide space for a ready handhold when the handle 34 is to be manipulated.

With the horizontal spacer gage member 15 and vertical spacer gage member 16 both in place, as shown in FIG. 5, mortar is placed on outside and inside edges of the transverse surfaces 12 of the blocks 13 of the lower course. The rods 31, 32 and 33 provide an effective depth gage for the amount of mortar placed on the transverse surfaces, there being applied mortar to a depth just covering the rods. The new block to be laid (not shown) is buttered at outside and inside edges of the transverse end face in the same manner as was described in connection with FIG. 1. The block is then placed on the rods 31, 32 and 33 and pushed endwise into position against the rods 20 and 21 of the gage member 15. The block is, at the same time, pressed down firmly on top of the rods 31, 32 and 33. Normally the block is placed one or two inches away from the block already in place, and then slid on the rods 31, 32 and 33 until it is even with the end of the block 13' already in place and with the sides also of the blocks 13 of the lowermost course.

The craftsman then, with one hand on the block to hold it in position, removes the gage member 15 by use of the handle 22 and the gage member 16 by use of the handle 34. Since mortar joints on the outside surface are already filled, it is necessary only to rake the joints on the outside. When the insides of the joints are raked with a conventional striker tool, the holes left by the rods are effectively closed. Because of this operation, it has been found preferable in laying a block wall as described to manipulate the gage members from the inside of the wall surface rather than the outside, if there be such an inside and outside, and that way to better preserve the uniform character of the mortar joints where they are most likely to be viewed.

Although the rods 20 and 21 of the horizontal spacer gage member 15 are preferably slightly smaller in diameter than the expected thickness of the mortar joint 14, it is preferable to have the diameter of the rods 31, 32 and 33 more or less exactly the same as the anticipated thickness of the joint 30. This is because the blocks are slid and pressed into engagement with the circumference of the rods in a downward direction whereby the rods serve as a more precise thickness gage, there being adequate mortar in the joint to support the block at the chosen level after the gage member 16 has been withdrawn.

Although the relationship of diameters as between the rods 20, 21 and the rods 31, 32 and 33 is one providing mortar joints 14 and 30 of the same thickness, should it be preferred to have one or the other of such joints of different thickness, the different thickness can be assured by changing the rod diameter of the respective gage member. Not only is the gage apparatus effective for providing uniform joints, but also in establishing the mortar joints of a desired optimum thickness which will assure maximum strength in the ultimately finished block wall.

In employment of the gage apparatus for laying bricks 40, as shown in FIGS. 8 through 12, the gage members are made of substantially the same general construction but are somewhat smaller in size. A horizontal spacer gage member 41, for example, is provided with rods 42 and 43, and a positioning guide 44 arranged in such fashion that the free ends of the rods 42, 43 have a length less than the thickness of the bricks 40. A handle 45 is employed for holding the rods 42, 43 in the same manner as for the gage member 15. On this occasion, because of bricks being more easily handled, the second positioning guide can be omitted and the positioning guide placed on the top surface of the brick with the rods extending downwardly.

A vertical spacer gage member 46 makes use of four rods 47, 48, 49 and 50. These are longitudinally spaced along a positioning guide 51 at distances such that the gage member can accommodate two bricks at one time and welded to a handle 54. When two bricks at one time are to be laid, a second gage member 41 is helpful. The gage members 41 and 46 are used in laying bricks in the manner similar to that described for the gage members 15 and 16, the diameters of the rods, however, being such as to provide respective horizontal and vertical mortar joints 52 and 53 of thickness more suitable to brick. Here again, it is found preferable to have the diameter of the rods 42 and 43 slightly smaller than the diameter of the rods 47, 48, 49 and 50 so that in the end, the joints 52 and 53 will be of substantially the same ultimate thickness, except for those occasions where a definite different thickness may be desired.

While particular embodiments of the present invention have been shown and described, it will be obvious to those skilled in the state of the art that changes and modifications may be made without departing from the invention in its broader aspects, and therefore, the aims of its appended claims is to cover all such changes and modifications as fall within the true spirit and scope of this invention.

Having described the invention, what is claimed as new in support of Letters Patent is as follows:

1. A gage member for the laying of multiple courses of individual blocks wherein the blocks have vertical and horizontal transverse faces for application of mortar and exposed faces and wherein the individual blocks in the wall are spaced by both vertical and horizontal mortar joints, said gage member comprising a positioning guide for engagement with exposed faces of the blocks, spacer means comprising a plurality of parallel horizontally spaced spacer rods anchored to said positioning guide and adapted to overlie the transverse faces when mortar is applied, said rods having portions of substantially equal length extending outwardly of said positioning guide, and a handle rod anchored to certain of said portions at a location spaced from said positioning guide.

2. A gage member as in claim 1 wherein the rod length between free ends of said spacer rods and the positioning guide is less than the distance across the corresponding transverse face and the spacer means comprises at least three spacer rods.

3. A gage apparatus including the gage member of claim 1 wherein there is a separate second gage member, said members being adapted to space blocks respectively in a vertical direction and in a horizontal direction, the spacer means for the second gage member having a thickness less than the thickness of the spacer means for the first identified gage member.

4. A gage apparatus including the gage member of claim 1 wherein there is a separate second gage member, said members being adapted to space blocks respectively in a vertical direction and in a horizontal direction, said second gage member having first and second positioning guides, the second of said positioning guides having an operative position in right angular relationship relative to the operative position of said first positioning guide whereby to support said second gage member on a block in a vertical operative position.

5. A gage member as in claim 1 wherein outermost spacer rods of said spacer means have a distance therebetween in excess of the length of one of said blocks whereby to simultaneously support two of said blocks in vertically spaced relationship.

6. A gage member as in claim 1 wherein said handle rod has a length longer than the distance between outermost spacer rods of said spacer means, said spacer rods, said positioning guide and said handle rod being elongated cylindrical elements in fixed engagement with each other and said fixed engagement is a weldment.

* * * * *